(12) United States Patent
Lian et al.

(10) Patent No.: US 12,487,251 B2
(45) Date of Patent: Dec. 2, 2025

(54) ADAPTIVE CHIP TESTING APPARATUS AND FORMATION METHOD THEREOF

(71) Applicant: SEMIGHT INSTRUMENTS CO., LTD, Suzhou (CN)

(72) Inventors: Zhe Lian, Suzhou (CN); Jianjun Huang, Suzhou (CN); Yonghong Wu, Suzhou (CN); Shan Zhao, Suzhou (CN); Haiyang Hu, Suzhou (CN)

(73) Assignee: SEMIGHT INSTRUMENTS CO., LTD, Suzhou (CN)

( * ) Notice: Subject to any disclaimer, the term of this patent is extended or adjusted under 35 U.S.C. 154(b) by 142 days.

(21) Appl. No.: 18/433,754

(22) Filed: Feb. 6, 2024

(65) Prior Publication Data
US 2025/0020687 A1 Jan. 16, 2025

Related U.S. Application Data

(63) Continuation of application No. PCT/CN2023/134150, filed on Nov. 24, 2023.

(30) Foreign Application Priority Data

Jul. 10, 2023 (CN) .......................... 202310833130.2

(51) Int. Cl.
*G01R 31/28* (2006.01)
*G01R 1/04* (2006.01)

(52) U.S. Cl.
CPC ....... *G01R 1/0441* (2013.01); *G01R 31/2893* (2013.01)

(58) Field of Classification Search
CPC ............ G01R 31/2893; G01R 31/2887; G01R 31/2889; G01R 31/2808; G01R 31/2886; G01R 31/2868
USPC .............. 324/750.14, 750.16, 750.2, 750.22, 324/754.07, 754.11, 754.16, 756.01, 324/756.07, 757.01
See application file for complete search history.

(56) References Cited

U.S. PATENT DOCUMENTS

| | | | | |
|---|---|---|---|---|
| 6,359,452 B1 * | 3/2002 | Mozzetta | ............. | G01R 1/0408 324/750.25 |
| 8,044,673 B1 * | 10/2011 | Burgyan | ............. | G01R 1/0466 324/750.16 |
| 8,212,578 B1 * | 7/2012 | Gajda | .................... | G01R 33/12 324/750.16 |
| 2003/0034280 A1 * | 2/2003 | Jung | .................. | G01R 31/2887 209/573 |

(Continued)

*Primary Examiner* — Roberto Velez
(74) *Attorney, Agent, or Firm* — ANOVA LAW GROUP, PLLC

(57) ABSTRACT

The present disclosure provides an adaptive die testing apparatus and a formation method. The adaptive die testing apparatus includes a support frame capable of moving along a vertical direction; a movable panel capable of moving along a horizontal direction; an upper test socket installed on the support frame; and a lower test socket installed on the movable panel and capable of moving with the movable plate to directly below the upper test socket. A groove is formed on a lower surface of the upper test socket and/or an upper surface of the lower test socket. When the adaptive die testing apparatus is at a testing state, the lower surface of the upper test socket is in a close contact with the upper surface of the lower test socket, and a sealed chamber for placing a die to-be-tested is formed at a region of the groove.

20 Claims, 9 Drawing Sheets

(56) References Cited

U.S. PATENT DOCUMENTS

2006/0043990 A1* 3/2006 Sato .................. G01R 31/2893
                                                                   324/762.01
2010/0127726 A1* 5/2010 Abe ................ G01R 31/31905
                                                                   324/756.03

* cited by examiner

ADAPTIVE CHIP TESTING APPARATUS AND FORMATION METHOD THEREOF

CROSS-REFERENCE TO RELATED APPLICATION

This application is a continuation application of PCT/CN2023/134150, filed on Nov. 24, 2023, which claims the priority of Chinese Patent Application No. 202310833130.2, filed on Jul. 10, 2023, the entirety of all of which is incorporated herein by reference.

TECHNICAL FIELD

The present disclosure generally relates to the field of semiconductor die testing technology and, more particularly, relates to an adaptive die testing apparatus and a formation method thereof.

BACKGROUND

With development of the semiconductor industry, MCM (multi-die module) packaging technology based on bare dies is increasingly popular. However, the reduction in packaging yield and reliability caused by unknown quality problems of bare dies has greatly limited MCM packaging technology. KGD (known good die) testing of bare dies is the key to improving the MCM yield and reliability.

A KGD process requires dies to-be-installed in temporary clamping carriers to complete testing and screening, and the dies are classified and sorted based on performance differences. After a wafer in a previous process is aged and wafer cutting is completed, based on test data obtained in the aging process, testing, screening and classification of the bare dies are performed before packaging to obtain KGDs.

The bare dies of certain power chips are extremely thin, and a region of a single pad configured to be in a contact with a test pin is extremely small. Therefore, the accuracy of test sockets configured to load the bare dies to-be-tested during testing, especially the flatness after the mold including upper and lower test sockets is closed, needs to be extremely high; and the flatness is not convenient for sensing and detection by sensors. Moreover, testing requires ultra-large current and ultra-high voltage. The test is a high-pressure environment, so that entire test clamping apparatus needs to ensure a high-pressure testing atmosphere. A maximum breakdown voltage is increased by increasing air pressure around the die, thereby avoiding space discharge between pins. Therefore, high requirement is needed for air tightness at a mold-closed testing state.

SUMMARY

One aspect of the present disclosure provides an adaptive die testing apparatus. The adaptive die testing apparatus includes a support frame capable of moving along a vertical direction; a movable panel capable of moving along a horizontal direction; an upper test socket installed on the support frame; and a lower test socket installed on the movable panel and capable of moving with the movable plate to directly below the upper test socket. A groove is formed on a lower surface of the upper test socket and/or an upper surface of the lower test socket. When the adaptive die testing apparatus is at a testing state, the lower surface of the upper test socket is in a close contact with the upper surface of the lower test socket, and a sealed chamber for placing a die to-be-tested is formed at a region of the groove; a PCB (printed circuit board) and a separation plate are stacked sequentially above the upper test socket; the upper test socket, the PCB and the separation plate, which are fixed connected to each other, are connected to the support frame through an installation plate disposed above the separation plate; and an end of a pipeline sequentially passes through the installation plate, the separation plate, the PCB and the upper test socket and is connected to the sealed chamber, and another end of the pipeline is configured to be connected to a high-pressure gas source. A strip-shaped through hole is formed at an upper surface of the support frame; a first protruding strip is at each of lower portions of two opposite inner walls of the strip-shaped through hole; a corresponding second protruding strip extending directly above the first protruding strip is at each of upper portions of two opposite side surfaces of the installation plate; a strip-shaped block is disposed above each second protruding strip; a side of the strip-shaped block is fixedly connected to the upper surface of the support frame, and another side of the strip-shaped block extends to directly above the second protruding strip and is connected to the second protruding strip through at least two springs. When the adaptive die testing apparatus is at a non-testing state, a lower surface of the second protruding strip is adjoined to be in a contact with an upper surface of a corresponding first protruding strip; and when the adaptive die testing apparatus is at the testing state, the lower surface of the upper test socket is in a close contact with the upper surface of the lower test socket, and a gap is formed between the lower surface of the second protruding strip and the upper surface of the corresponding first protruding strip.

Another aspect of the present disclosure provides an adaptive die testing apparatus. The adaptive die testing apparatus includes a support frame capable of moving along a vertical direction; a movable panel capable of moving along a horizontal direction; an upper test socket installed on the support frame; and a lower test socket installed on the movable panel and capable of moving with the movable plate to directly below the upper test socket. A groove is formed on a lower surface of the upper test socket and/or an upper surface of the lower test socket. When the adaptive die testing apparatus is at a testing state, the lower surface of the upper test socket is in a close contact with the upper surface of the lower test socket, and a sealed chamber for placing a die to-be-tested is formed at a region of the groove; a PCB (printed circuit board) and a separation plate are stacked sequentially above the upper test socket; the upper test socket, the PCB and the separation plate, which are fixed connected to each other, are connected to the support frame through an installation plate disposed above the separation plate; an end of a pipeline sequentially passes through the installation plate, the separation plate, the PCB and the upper test socket and is connected to the sealed chamber, and another end of the pipeline is configured to be connected to a high-pressure gas source; and the separation plate, the PCB and the upper test socket are fixedly connected to each other through at least two sets of bolts and nuts.

Another aspect of the present disclosure provides a formation method of an adaptive die testing apparatus. The method includes disposing a support frame capable of moving along a vertical direction and a movable panel capable of moving along a horizontal direction; installing an upper test socket on the support frame; and installing a lower test socket on the movable panel, where the lower test socket is capable of moving with the movable plate to directly below the upper test socket. A groove is formed on a lower surface of the upper test socket and/or an upper surface of the lower test socket. When the adaptive die testing apparatus is at a testing state, the lower surface of the upper test socket is in a close contact with the upper surface of the lower test socket, and a sealed chamber for placing a die to-be-tested is formed at a region of the groove; a PCB (printed circuit board) and a separation plate are stacked sequentially above the upper test socket; the upper test socket, the PCB and the separation plate, which are fixed connected to each other, are connected to the support frame through an installation plate disposed above the separation plate; and an end of a pipeline sequentially passes through the installation plate, the separation plate, the PCB and the upper test socket and is connected to the sealed chamber, and another end of the pipeline is configured to be connected to a high-pressure gas source. A strip-shaped through hole is formed at an upper surface of the support frame; a first protruding strip is at each of lower portions of two opposite inner walls of the strip-shaped through hole; a corresponding second protruding strip extending directly above the first protruding strip is at each of upper portions of two opposite side surfaces of the installation plate; a strip-shaped block is disposed above each second protruding strip; a side of the strip-shaped block is fixedly connected to the upper surface of the support frame, and another side of the strip-shaped block extends to directly above the second protruding strip and is connected to the second protruding strip through at least two springs. When the adaptive die testing apparatus is at a non-testing state, a lower surface of the second protruding strip is adjoined to be in a contact with an upper surface of a corresponding first protruding strip; and when the adaptive die testing apparatus is at the testing state, the lower surface of the upper test socket is in a close contact with the upper surface of the lower test socket, and a gap is formed between the lower surface of the second protruding strip and the upper surface of the corresponding first protruding strip.

Other aspects of the present disclosure may be understood by those skilled in the art in light of the description, the claims, and the drawings of the present disclosure.

BRIEF DESCRIPTION OF THE DRAWINGS

Accompanying drawings, which are incorporated into a part of the present disclosure, illustrate embodiments of the present disclosure and together with the specification to explain the principle of the present disclosure. With reference to accompanying drawings, some specific embodiments of the present disclosure are described in detail below through a manner of illustration and not-limitation. Same reference numbers in accompanying drawings means same or similar parts or portions. Those skilled in the art should understand that accompanying drawings are not necessarily drawn according to scale.

DETAILED DESCRIPTION

Figure 1:
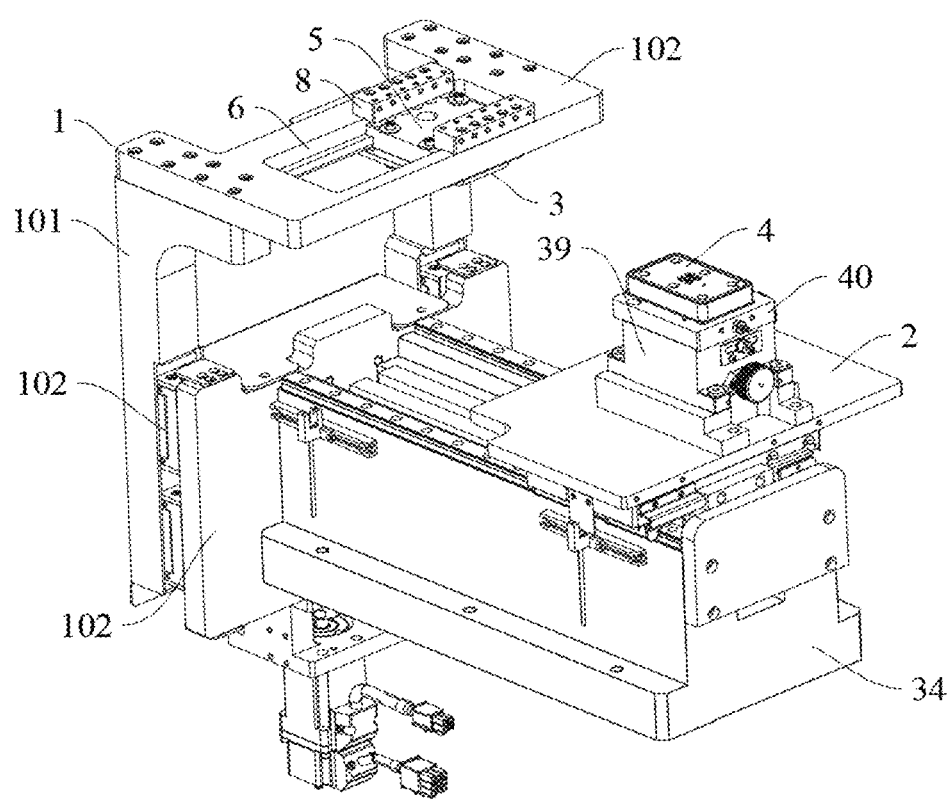
FIG. 1 illustrates a structural schematic of an adaptive die testing apparatus according to various embodiments of the present disclosure.

Various exemplary embodiments of the present disclosure are described in detail with reference to accompanying drawings. It should be noted that unless stated otherwise, relative arrangement of assemblies and steps, numerical expressions and values described in those embodiments may not limit the scope of the present disclosure.

Following description of at least one exemplary embodiment may be merely illustrative and may not be configured to limit the present disclosure and its application or use.

The technologies, methods and apparatuses known to those skilled in the art may not be discussed in detail, but where appropriate, the technologies, methods and apparatuses should be considered as a part of the present disclosure.

In all examples shown and discussed herein, any specific value should be interpreted as merely exemplary, rather than as a limitation. Therefore, other examples in exemplary embodiment may have different values.

It is apparent to those skilled in the art that various modifications and variations may be made in the present disclosure without departing from the spirit or scope of the present disclosure. Therefore, the present disclosure is intended to cover modifications and variations of the present disclosure falling within the scope of corresponding claims (technical solutions to be protected) and their equivalents. It should be noted that, implementation manners provided in embodiment of the present disclosure may be combined with each other if there is no contradiction.

It should be noted that similar reference numerals and letters are configured to indicate similar items in following drawings. Therefore, once an item is defined in one drawing, it does not need to be further discussed in subsequent drawings.

The present disclosure can be further clearly understood through the specific examples given below, which may not limited the present disclosure.

A known good die (KGD) is defined as a package type fully supported by suppliers to meet or exceed quality, reliability, and functional data sheet specifications, with non-standardized (die specific) but completely and electronically transferable mechanical specifications. A KGD (known good die) testing apparatus (e.g., KGD testing machine, KGD tester, KGD testing equipment, or KGD test cell) is configured for the die testing before packaging and after splitting. The die testing apparatus confirms that dies with desirable performance are used for packaging before high-density packaging, which improves the cumulative packaging yield. The die testing apparatus may realize a fully automatic testing system and automatically realize picking, transporting, testing and unloading of dies. The die testing apparatus may support multi-station parallel testing. Different stations may support different temperatures and test projects. Different stations may support static, dynamic, and avalanche function tests; and the test sequence may be adjustable. The die testing apparatus may support high temperature testing with a temperature range from room temperature to 200° C. The power-on pin card may be a sealed design, support nitrogen filling protection against high-pressure sparking and nitrogen pressure monitoring and support high-temperature preheating and die surface anti-oxidation protection. It should be noted that "die" and "chip" may be interchangeable in the present disclosure, which may not be limited according to various embodiments of the present disclosure.

Figure 2:
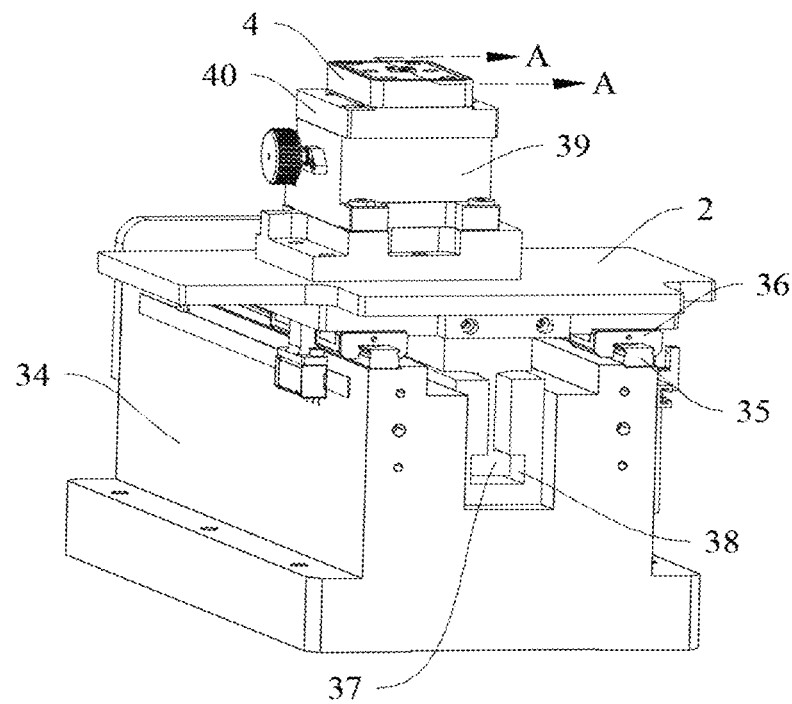
FIG. 2 illustrates a partial structural schematic of an adaptive die testing apparatus according to various embodiments of the present disclosure.
Figure 3:
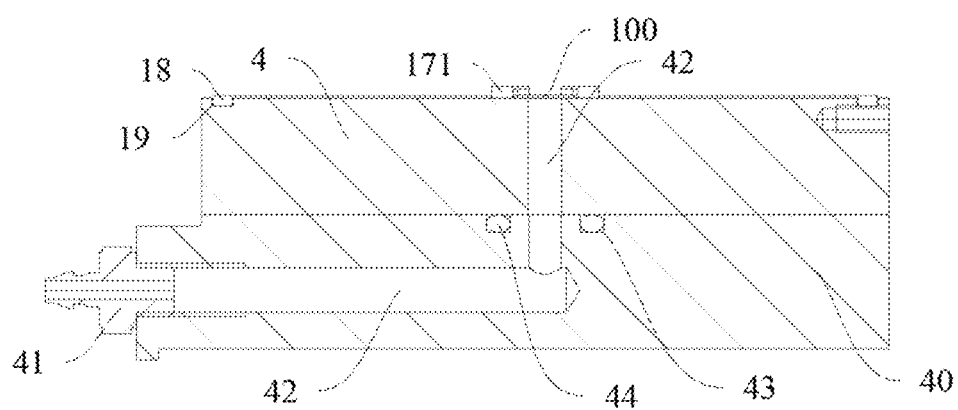
FIG. 3 illustrates a cross-sectional view along an A-A direction in FIG. 2.
Figure 4:
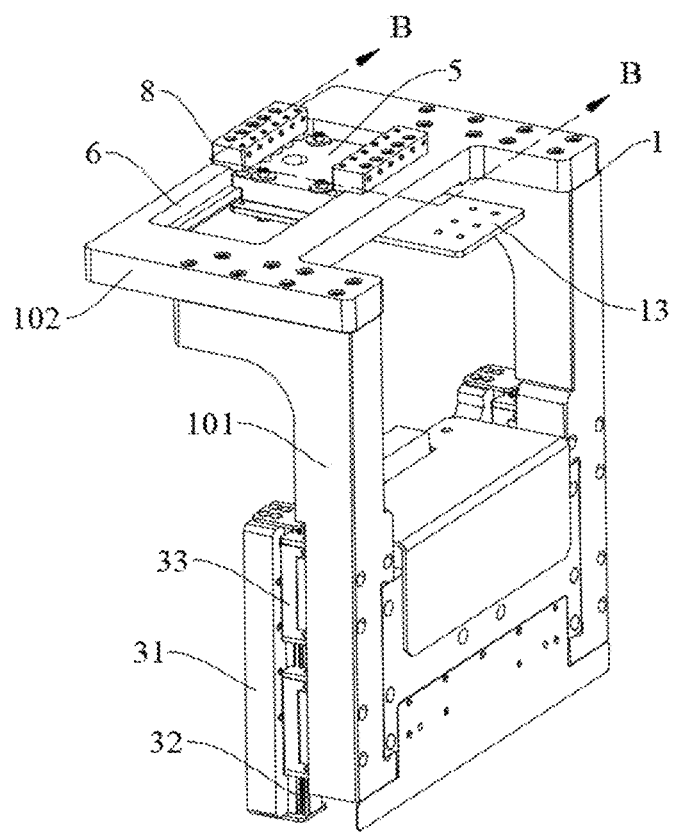
FIG. 4 illustrates another partial structural schematic of an adaptive die testing apparatus according to various embodiments of the present disclosure.
Figure 5:
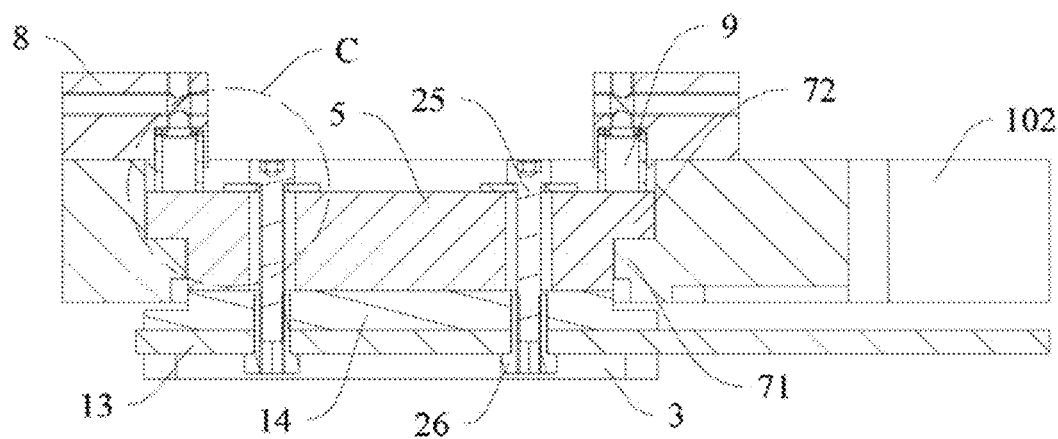
FIG. 5 illustrates a cross-sectional view along a B-B direction in FIG. 4.
Figure 6:
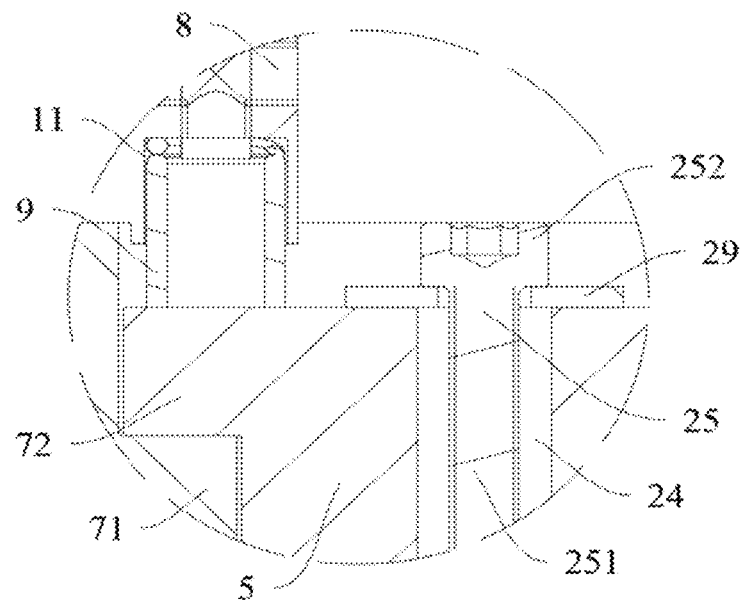
FIG. 6 illustrates an enlarged schematic at a position C in FIG. 5.
Figure 7:
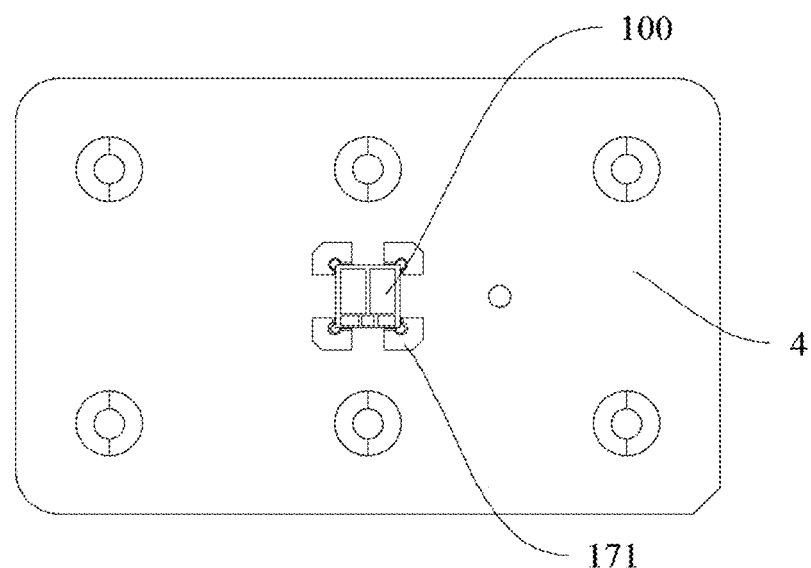
FIG. 7 illustrates a structural schematic of a lower test socket of an adaptive die testing apparatus according to various embodiments of the present disclosure.
Figure 8:
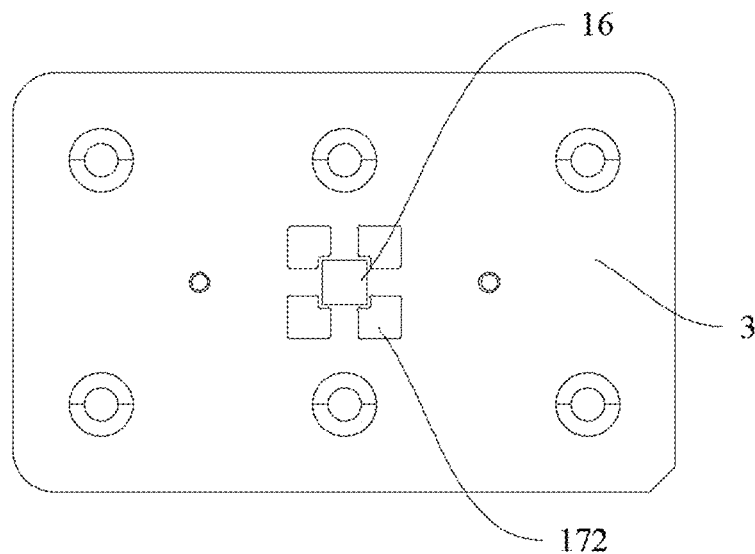
FIG. 8 illustrates a structural schematic of an upper test socket of an adaptive die testing apparatus according to various embodiments of the present disclosure.
Figure 9:
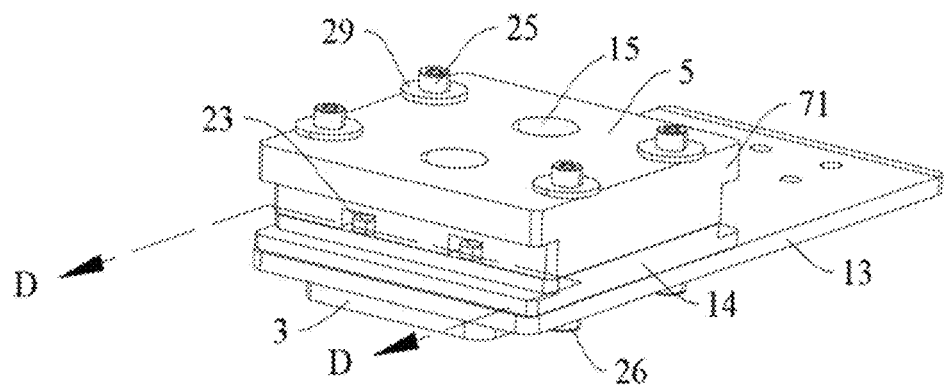
FIG. 9 illustrates another partial structural schematic of an adaptive die testing apparatus according to various embodiments of the present disclosure.
Figure 10:
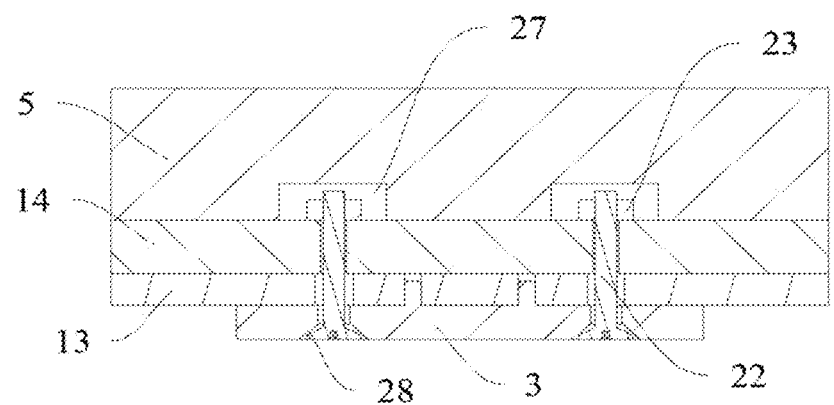
FIG. 10 illustrates a cross-sectional view along a D-D direction in FIG. 9.
Figure 11:
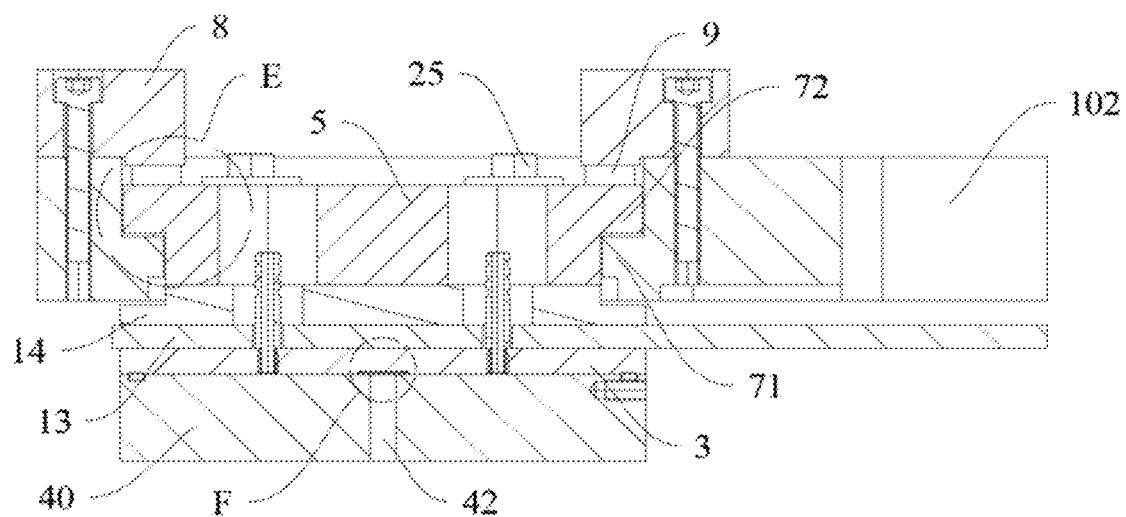
FIG. 11 illustrates a structural schematic of a mold-closed state of an adaptive die testing apparatus according to various embodiments of the present disclosure.
Figure 12:
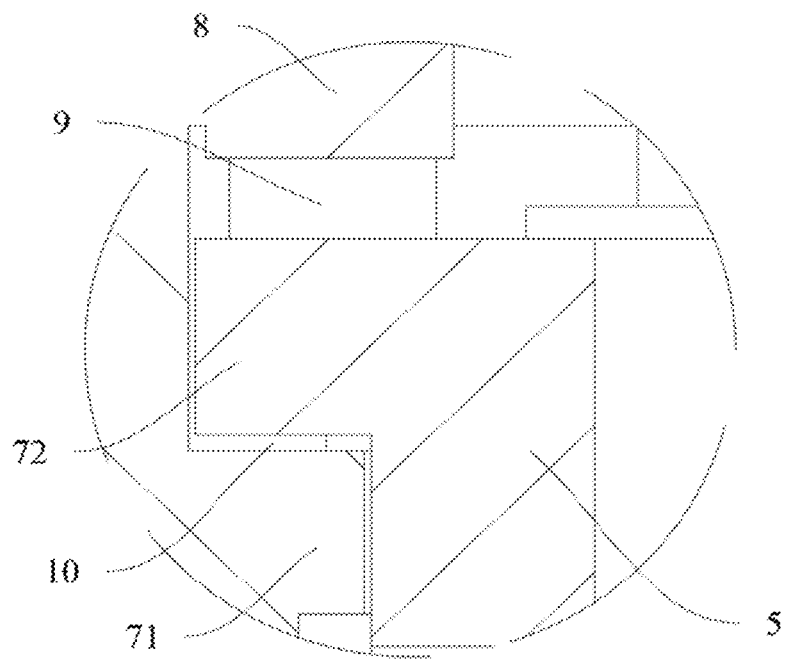
FIG. 12 illustrates an enlarged schematic at a position E in FIG. 11.
Figure 13:
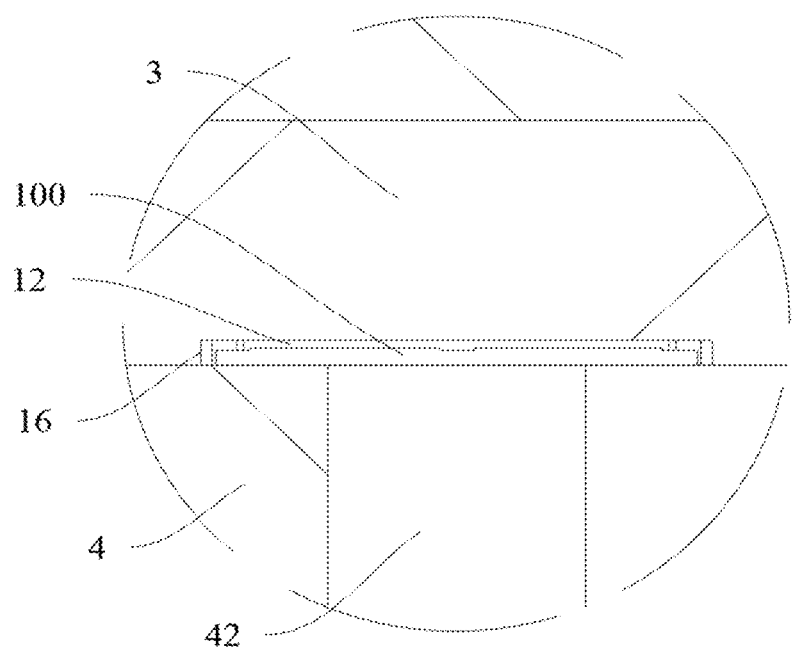
FIG. 13 illustrates an enlarged schematic at a position F in FIG. 11.

Exemplary embodiments are described in the present disclosure with reference to FIGS. 1-13, which are schematics used for describing various, different embodiments. Referring to FIGS. 1-13, FIG. 1 illustrates a structural schematic of an adaptive die testing apparatus according to various embodiments of the present disclosure; FIG. 2 illustrates a partial structural schematic of the adaptive die testing apparatus according to various embodiments of the present disclosure; FIG. 3 illustrates a cross-sectional view along an A-A direction in FIG. 2; FIG. 4 illustrates another partial structural schematic of the adaptive die testing apparatus according to various embodiments of the present disclosure; FIG. 5 illustrates a cross-sectional view along a B-B direction in FIG. 4; FIG. 6 illustrates an enlarged schematic at a position C in FIG. 5; FIG. 7 illustrates a structural schematic of a lower test socket of the adaptive die testing apparatus according to various embodiments of the present disclosure; FIG. 8 illustrates a structural schematic of an upper test socket of the adaptive die testing apparatus according to various embodiments of the present disclosure; FIG. 9 illustrates another partial structural schematic of the adaptive die testing apparatus according to various embodiments of the present disclosure; FIG. 10 illustrates a cross-sectional view along a D-D direction in FIG. 9; FIG. 11 illustrates a structural schematic of a mold-closed state of the adaptive die testing apparatus according to various embodiments of the present disclosure; FIG. 12 illustrates an enlarged schematic at a position E in FIG. 11; and FIG. 13 illustrates an enlarged schematic at a position F in FIG. 11.

Exemplary Embodiment One

The present disclosure provides an adaptive die testing apparatus. The adaptive die testing apparatus may include a support frame 1 capable of moving along a vertical direction, a movable panel 2 capable of moving along a horizontal direction, an upper test socket 3 installed on the support frame 1, and a lower test socket 4 installed on the movable panel 2 and capable of moving with the movable plate 2 to directly below the upper test socket 3. A groove may be formed on the lower surface of the upper test socket 3 and/or an upper surface of the lower test socket 4. When the die testing apparatus is at a testing state, the lower surface of the upper test socket 3 may be in a close contact with the upper surface of the lower test socket 4, and a sealed chamber 12 for placing the die 100 to-be-tested may be formed in a region of the groove. A printed circuit board (PCB) 13 and a separation plate 14 may be stacked sequentially above the upper test socket 3. The upper test socket 3, the PCB 13 and the separation plate 14, which are fixed connected to each other, may be connected to the support frame 1 through an installation plate 5 disposed above the separation plate 14. One end of a pipeline 15 may sequentially pass through the installation plate 5, the separation plate 14, the PCB 13 and the upper test socket 3 and may be connected to the sealed chamber 12; and another end of the pipeline 15 may be configured to be connected to a high-pressure gas source.

The movable plate may be moved to a loading and unloading station at the end of the horizontal base away from the installation base plate to facilitate picking and placing of the dies.

Through a loading apparatus, the die to-be-tested may be placed in a designated region on the lower test socket above the movable plate, that is, above multiple test pins; and multiple test pins and pad regions on the die to-be-tested may be in a one-to-one correspondence.

A strip-shaped through hole 6 may be formed on the upper surface of the support frame 1. A first protruding strip 71 may be at each of the lower portions of two opposite inner walls of the strip-shaped through hole 6. A corresponding second protruding strip 72 extending directly above the first protruding strip 71 may be at each of the upper portions of two opposite side surfaces of the installation plate 5. A strip-shaped block 8 may be disposed above each second protruding strip 72. One side of the strip-shaped block 8 may be fixedly connected to the upper surface of the support frame 1; and another side of the strip-shaped block 8 may extend to directly above the second protruding strip 72 and may be connected to the second protruding strip 72 through at least two springs 9. When the die testing apparatus is at a non-testing state, the lower surface of the second protruding strip 72 may be adjoined to be in a contact with the upper surface of corresponding first protruding strip 71. When the die testing apparatus is at the testing state, the lower surface of the upper test socket 3 may be in a close contact with the upper surface of the lower test socket 4, and a gap 10 may be formed between the lower surface of the second protruding strip 72 and the upper surface of corresponding first protruding strip 71.

Referring to FIG. 5, the upper test socket 3, the installation plate 5 and the PCB 13 in the middle portion of FIG. 5 may be fixedly connected together to form an overall structure that can float up and down; and the spring 9 may exerts a downward pressing force above the overall structure. Exemplarily, the gap 10 may be between the overall structure and the upper surface and/or the lower surface of the first protruding strip 71 and such gap may be in a floating state (stroke). A spacer may also be placed in the gap at the upper side as needed to adjust the overall structure to a horizontal direction when the overall structure deflects. The horizontal direction actually refers to being in parallel with the direction of the lower test socket. The first protruding strip 71 may be configured for position limiting and leveling.

The upper test socket installed on the installation plate may continue to move downward with the support frame and receive an upward reaction force from the lower test socket.

Under the action of the reaction force, two second protruding strips on the installation plate may be upwardly separated from the first protruding strips on the support frame, thereby forming a gap between the second protruding strips and the first protruding strips. Moreover, the springs may continuously exert a downward pressing force on two second protruding strips on the installation plate; and the downward pressing force is the mold closing force. At this point, the upper test socket installed on the installation plate may be in a floating state, and it realizes that the plane reference of the upper test socket may be converted from the support frame to the lower test socket; and the springs may absorb and balance out slight deviation on the horizontal plane, thereby achieving a tight and flat contact or attachment between the upper test socket and the lower test socket. The upper test socket and the lower test socket may form the mold. The mold may include two states, that is, the mold-closed state and the mold-opening state. The mold-closed state refers to that the die has been placed in the accommodating chamber, and the upper test socket and the lower test socket are pressed together. The mold-opening state refers to that the upper test socket and the lower test socket are open to be not pressed together.

In one embodiment, each of above-mentioned second protruding strips 72 may be connected to the strip-shaped block 8 through a plurality of sprints 9 (e.g., five springs) arranged at equal intervals along the length direction of the strip-shaped block.

In one embodiment, an installation groove 11 for the end of the spring 9 to be inserted may be formed at both the upper surface of the second protruding strip 72 and the lower surface of the strip-shaped block 8.

In one embodiment, the adaptive die testing apparatus may further include an installation base plate 31 vertically configured. Two vertical guiding rails 32 spaced apart from and in parallel with each other may be installed on a side of the installation base plate 31. The vertical portion 101 of the support frame 1 may be matched with and connected to each vertical guiding rail 32 through at least two vertical slide blocks 33, such that the vertical guiding rails 32 may be capable of moving along the vertical direction. The upper test socket 3 may be installed on the horizontal portion 102 of the support frame 1. The horizontal portion 102 may be at the upper end of the vertical portion 101 and extend to another side of the installation base plate 31.

In one embodiment, a horizontal base 34 may be installed on another side surface of above-mentioned installation base plate 31 and below the horizontal portion 102 of the support frame 1. Two horizontal guiding rails 35 spaced apart from and in parallel with each other may be installed on the upper surface of the horizontal base 34. The lower surface of the movable plate 2 may be connected to each horizontal guiding rail 35 through at least two horizontal slide blocks 36.

In one embodiment, a T-shaped block 37 may be disposed on the lower surface of above-mentioned movable plate 2 and between two horizontal guiding rails 35. A T-shaped groove 38 matched with the T-shaped block 37 may be formed at the horizontal base 34. The T-shaped block 37 may be capable of being slidably inserted in the T-shaped slot 38 extending along the horizontal direction.

In one embodiment, a two-way sliding platform 39 may be installed on the upper surface of above-mentioned movable plate 2, and the lower test socket 4 may be installed on the two-way sliding platform 39.

In one embodiment, the lower surface of the above-mentioned lower test socket 4 may be connected to a lower base place 40. A vacuum pipe joint 41 may be installed on the side surface of the lower base plate 40. A vacuum pipeline 42 may be disposed in the lower test socket 4 and the lower base plate 40. One end of the vacuum pipeline 42 may be connected to the sealed chamber 12, and the other end of the vacuum pipeline 42 may be connected to the vacuum pipe joint 41.

In one embodiment, an annular groove 43 may be formed at the upper surface of the lower base plate 40 and an outer side of the vacuum pipe 42. An annular sealing strip 44 may be inserted in the annular groove 43.

In one embodiment, a sealing strip 18 may be disposed between the lower surface of the upper test socket 3 and the upper surface of the lower test socket 4. The sealing strip 18 may extend continuously along peripheral edges of the upper test socket 3 and the lower test socket 4.

Exemplary Embodiment Two

The present disclosure provides an adaptive die testing apparatus. The adaptive die testing apparatus may include the support frame 1 capable of moving along the vertical direction, the movable panel 2 capable of moving along the horizontal direction, the upper test socket 3 installed on the support frame 1, and the lower test socket 4 installed on the movable panel 2 and capable of moving with the movable plate 2 to directly below the upper test socket 3. A groove may be formed on the lower surface of the upper test socket 3 and/or an upper surface of the lower test socket 4. When the die testing apparatus is at the testing state, the lower surface of the upper test socket 3 may be in a close contact with the upper surface of the lower test socket 4, and the sealed chamber 12 for placing the die 100 to-be-tested may be formed in a region of the groove. The printed circuit board (PCB) 13 and the separation plate 14 may be stacked sequentially above the upper test socket 3. The upper test socket 3, the PCB 13 and the separation plate 14, which are fixed connected to each other, may be connected to the support frame 1 through the installation plate 5 disposed above the separation plate 14. One end of the pipeline 15 may sequentially pass through the installation plate 5, the separation plate 14, the PCB 13 and the upper test socket 3 and may be connected to the sealed chamber 12; and another end of the pipeline 15 may be configured to be connected to a high-pressure gas source.

The movable plate may be pushed to move along the horizontal guiding rail toward the installation base plate through a horizontal drive component (such as a motor, a screw, or a cylinder) until the lower test socket is moved to a testing station directly below the upper test socket.

The support frame may be driven downward through a vertical drive component (such as a motor, a screw, or a cylinder).

In such process, after the mold including the upper test socket and the lower test socket is closed, high-pressure nitrogen may be injected into the sealed chamber for protection, and the test may be performed subsequently.

The adaptive die testing apparatus may further include the strip-shaped through hole 6 formed on the upper surface of the support frame 1. The first protruding strip 71 may be at each of the lower portions of two opposite inner walls of the strip-shaped through hole 6. A corresponding second protruding strip 72 extending directly above the first protruding strip 71 may be at each of the upper portions of two opposite side surfaces of the installation plate 5.

The adaptive die testing apparatus may further include the strip-shaped block 8 disposed above each second protruding strip 72. One side of the strip-shaped block 8 may be fixedly connected to the upper surface of the support frame 1; and another side of the strip-shaped block 8 may extend to directly above the second protruding strip 72 and may be connected to the second protruding strip 72 through at least two springs 9.

When the die testing apparatus is at the non-testing state, the lower surface of the second protruding strip 72 may be adjoined to be in a contact with the upper surface of corresponding first protruding strip 71. When the die testing apparatus is at the testing state, the lower surface of the upper test socket 3 may be in a close contact with the upper surface of the lower test socket 4, and the gap 10 may be formed between the lower surface of the second protruding strip 72 and the upper surface of corresponding first protruding strip 71.

As the support frame moves downward, the lower surface of the upper test socket may first be in a contact with the upper surface of the lower test socket, but there is still a slight deviation that prevents entire surfaces of the upper test socket and the lower test socket from being in a full contact with each other; and the spring may absorb and balance out small deviations along the horizontal plane, thereby achieving a tight and flat contact or attachment between the upper test socket and the lower test socket.

In one embodiment, each of above-mentioned second protruding strips 72 may be connected to the strip-shaped block 8 through a plurality of sprints 9 (e.g., seven springs) arranged at equal intervals along the length direction of the strip-shaped block.

In one embodiment, the installation groove 11 for the end of the spring 9 to be inserted may be formed at the lower surface of the strip-shaped block 8.

In one embodiment, the two-way sliding platform 39 may be installed on the upper surface of above-mentioned movable plate 2, and the lower test socket 4 may be installed on the two-way sliding platform 39.

In one embodiment, the lower surface of the above-mentioned lower test socket 4 may be connected to the lower base place 40. The vacuum pipe joint 41 may be installed on the side surface of the lower base plate 40. The vacuum pipeline 42 may be disposed in the lower test socket 4 and the lower base plate 40. One end of the vacuum pipeline 42 may be connected to the sealed chamber 12, and the other end of the vacuum pipeline 42 may be connected to the vacuum pipe joint 41.

In one embodiment, an installation groove 19 may be disposed at the edge of the upper surface of the lower test socket 4 for the lower portion of the sealing strip 18 to be inserted. The upper surface of the sealing strip 18 may be higher than the upper surface of the lower test socket 4.

In one embodiment, the separation plate 14, the PCB 13 and the upper test socket 3, which are stacked with each other, may be fixedly connected to each other through at least two sets of bolts 22 and nuts 23. A number of lifting through holes 24 may be disposed at the upper surface of the installation plate 5. A lifting bolt 25 may pass through the lifting through hole 24 and be threadedly connected to the lifting nut 26 inserted in the separation plate 14. The inner diameter of the lifting through hole 24 may be greater than the outer diameter of a column portion 251 of the lifting bolt 25. A gasket 26 may be sleeved on the column portion 251 of the lifting bolt 25. The gasket 26 may be between the upper surface of the installation plate 5 and a cap portion 252 of the lifting bolt 25. The installation plate 5 may be installed on the support frame 1 capable of moving along the vertical direction.

In one embodiment, the inner diameter of the lifting through hole 24 may be greater than the outer diameter of the cap portion 252 of the lifting bolt 25.

In one embodiment, each of above-mentioned bolts 22 (e.g., four bolts) may pass through the upper test socket 3, the PCB 13 and the separation plate 14 sequentially from a bottom to a top and may be threadedly connected to the nut 23 above the separation plate 14.

In one embodiment, four avoiding grooves 27 for the nuts 23 to be inserted may be disposed at the lower surface of above-mentioned installation plate 5, and the inner diameter of the avoiding groove 27 may be extremely greater than the outer diameter of the nut 23.

In one embodiment, a countersunk groove 28 for the head of the nut 23 to be inserted may be at the lower surface of above-mentioned upper test socket 3.

The working principle of the present disclosure is described in detail hereinafter.

The movable plate may be moved to the loading and unloading station at the end of the horizontal base away from the installation base plate to facilitate picking and placing of the dies.

Through the loading apparatus, the die to-be-tested may be placed in a designated region on the lower test socket above the movable plate, that is, above multiple test pins; and multiple test pins and pad regions on the die to-be-tested may be in a one-to-one correspondence.

The movable plate may be pushed to move along the horizontal guiding rail toward the installation base plate through a horizontal drive component (such as a motor, a screw, or a cylinder) until the lower test socket is moved to a testing station directly below the upper test socket.

The support frame may be driven downward through a vertical drive component (such as a motor, a screw, or a cylinder).

In such process, as the support frame moves downward, firstly, the lower surface of the upper test socket may be in a contact with the upper surface of the lower test socket, but there is still a slight deviation that prevents entire surfaces of the upper test socket and the lower test socket from being in a full contact with each other.

Subsequently, the upper test socket installed on the installation plate may continue to move downward with the support frame and receive an upward reaction force from the lower test socket. Under the action of the reaction force, two second protruding strips on the installation plate may be upwardly separated from the first protruding strips on the support frame, thereby forming a gap between the second protruding strips and the first protruding strips. Moreover, the springs may continuously exert a downward pressing force on two second protruding strips on the installation plate; and the downward pressing force is the mold closing pressing force. At this point, the upper test socket installed on the installation plate may be in a floating state, and it realizes that the plane reference of the upper test socket may be converted from the support frame to the lower test socket; and the springs may absorb and balance out slight deviation on the horizontal plane, thereby achieving a tight and flat contact or attachment between the upper test socket and the lower test socket. In such way, it may not only improve overall sealing and pressure resistance performance of the test sockets, but also ensure the consistency of the contact resistance between each test pin and corresponding pad region on the die, thereby improving test data consistency and avoiding sparking and pin ablation caused by poor contact in high-pressure environment.

After the mold including the upper test socket and the lower test socket is closed, high-pressure nitrogen may be injected into the sealed chamber for protection, and the test may be performed subsequently.

After the test is completed, the mold may be opened (i.e., at the mold-opening state), and the movable plate may drive the lower test socket to move back to the loading and unloading station; and then the unloading apparatus may pick the tested die, and the loading apparatus may re-insert a next die to-be-tested.

When using above-mentioned die testing apparatus, the die may be protected through high-pressure gas, which may improve the safety of the die under high-current and high-voltage testing condition. Furthermore, after the mold including the upper test socket and the lower test socket is closed, the plane reference of the upper test socket may be converted from the support frame to the lower test socket; and the springs may absorb and balance out slight deviation on the horizontal plane, thereby achieving a tight and flat contact or attachment between the upper test socket and the lower test socket. In such way, it may not only improve overall sealing and pressure resistance performance of the test sockets, but also ensure the consistency of the contact resistance between each test pin and corresponding pad region on the die, thereby improving test data consistency.

Figure 14A:
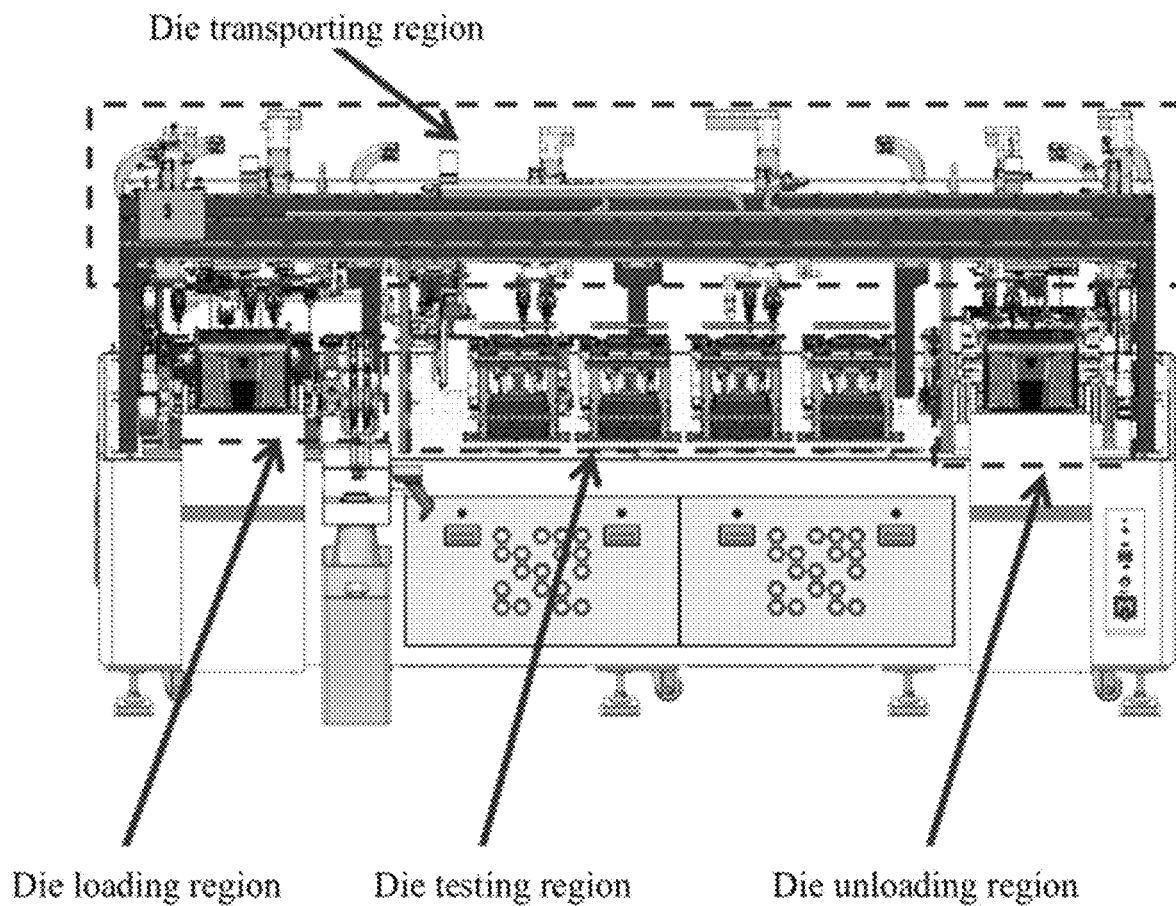
FIG. 14A illustrates a structural schematic of an exemplary die testing apparatus.
Figure 14B:
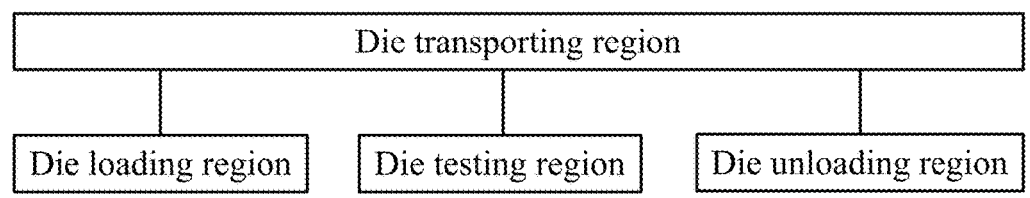
FIG. 14B illustrates a structural block diagram of the exemplary die testing apparatus in FIG. 14A.
Figure 15:
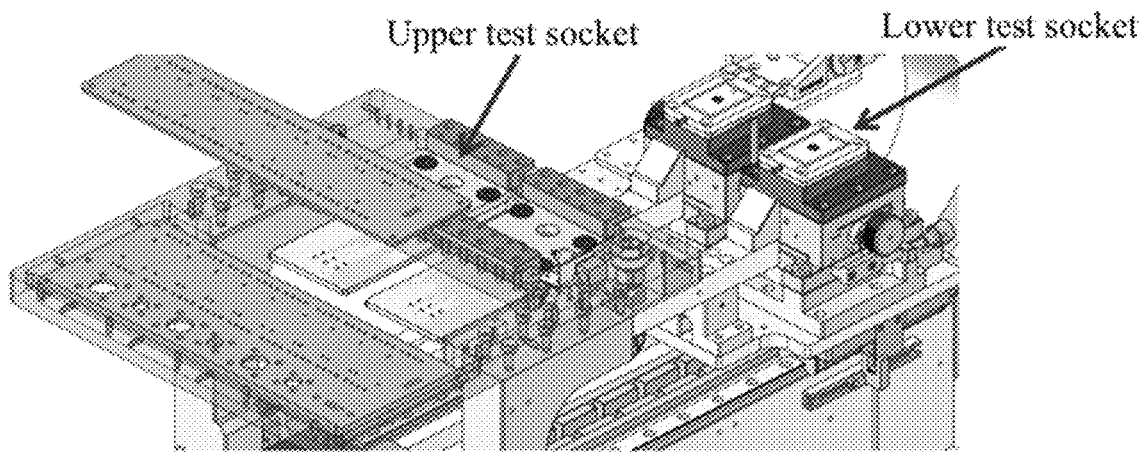
FIG. 15 illustrates a structural schematic of a die testing region of an exemplary die testing apparatus.

The main structure of the die testing apparatus (machine) may include four parts, that is, a die automatic loading region, a die transporting region, a die testing region and a die unloading region, as shown in FIGS. 14A-14B. Referring to FIGS. 14A-14B and 15, FIG. 14A illustrates a structural schematic of an exemplary die testing apparatus; FIG. 14B illustrates a structural block diagram of the exemplary testing apparatus in FIG. 14A; and FIG. 15 illustrates a structural schematic of a die testing region of the exemplary die testing apparatus. The adaptive die testing apparatus may be configured in the die testing region of FIGS. 14A-14B and 15.

The automatic die loading region may be configured for wafer loading, die positioning, die stripping and die picking; or automatically pick up the dies from a tape reel, and adapt to wafers of different sizes. The die transporting region may be configured for picking up dies by suction and transporting dies between different test stations. The die testing region may be configured for die position correction, temperature control and testing of different projects. The die testing region may be set up with multiple stations to support multi-station parallel testing or serial testing, and different test projects. The die unloading region may be configured for appearance inspection and unloading to different bins after the die testing is completed, so that dies may be tested and classified into different die bins. In the die automatic loading region, a conventional die loading apparatus may be utilized.

In the die transporting region, an imported high-speed linear motor may be utilized to ensure die transporting speed and stability. The main improvement lies in the suction nozzle transporting apparatus of the die. The suction nozzle transporting apparatus may include six sets of sub-suction-nozzle transporting apparatuses, which may operate in parallel without interfering with each other. Each set of sub-suction-nozzle transporting apparatus may include two suction nozzles which may suck two dies simultaneously. Each set of suction nozzles may be positioned independently to facilitate quick switching between different products. The suction nozzle may support temperature control and be preheated at high temperatures. The specially designed nozzle may avoid contact with the critical regions of the dies and reduce the risk of crushing injuries. The pressure of the suction nozzle to suck the dies may be adjustable to avoid improper suction or crushing of die surfaces. The suction nozzle may be disposed with a vacuum pressure sensor. By adjusting a vacuum pressure value, the adsorption strength of the suction nozzle may be ensured to prevent dies from falling during suction and transporting processes.

Referring to FIG. 15, in the die testing region, two dies on the suction nozzle may place materials (dies) to the calibration platform simultaneously. Two dies may perform position calibration simultaneously to reduce calibration time. Two sets of upper sockets may be installed on a connection board, and each set of sockets may be switched and powered through a signal switch. A high-temperature nitrogen interface may be reserved on the socket of each set. Two sets of lower sockets may be installed on a test carrier, each reserving two sets of temperature control interfaces. The upper and lower sockets may be independent of each other, making position correction and maintenance more convenient. The lower socket may be mounted on a high-speed linear motor and may quickly switch between a loading position and a testing position. A CCD (charge coupled device) may be disposed above a testing site to visually identify whether the die is correctly placed on the testing site. The testing site may be equipped with a vacuum pressure detection system. By determining a pressure value of a sucked die, whether the die is correctly placed on the site and whether there are any abnormalities such as warping may be determined, thereby ensuring that the die is correctly placed on the testing site and preventing warping or flipping.

In the die unloading region, a conventional material (die and/or wafer) unloading apparatus may be applied. An unloading station may be equipped with material (wafer/die) box in-situ detection to prevent unloading failure or abnormality due to that the material box is not empty in the unloading station or the material box is not in a safe position. A large-view CCD may be installed at the unloading station, which may monitor in real time whether an angle and a spacing of the die after being placed in the blue film are abnormal.

Exemplary Embodiment Three

Figure 16:
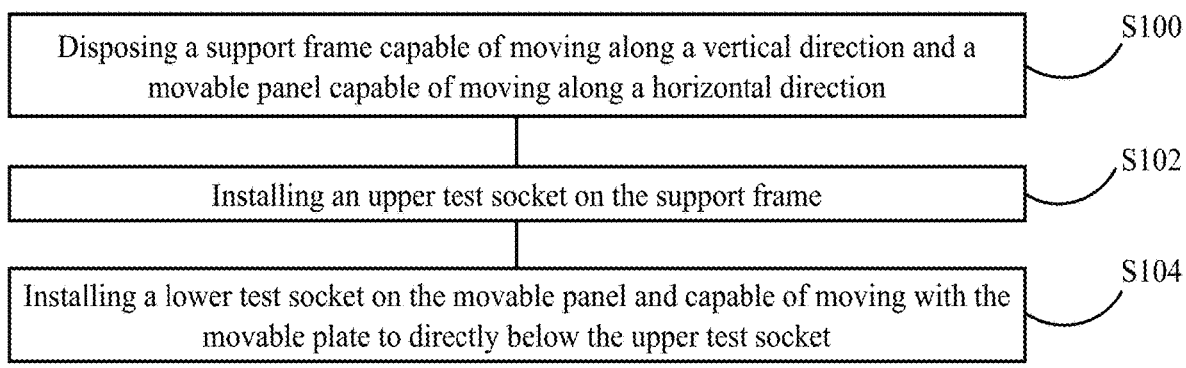
FIG. 16 illustrates a flowchart of a formation method of an adaptive die testing apparatus according to various embodiments of the present disclosure.

The present disclosure provides a formation method of the adaptive die testing apparatus. FIG. 16 illustrates a flowchart of the formation method of the adaptive die testing apparatus according to various embodiments of the present disclosure. Referring to FIG. 16, the formation method may include following exemplary steps.

At S100, the support frame 1 capable of moving along the vertical direction and the movable panel 2 capable of moving along the horizontal direction are disposed.

At S102, the upper test socket 3 is installed on the support frame 1.

At S104, the lower test socket 4 is installed on the movable panel 2 and capable of moving with the movable plate 2 to directly below the upper test socket 3.

It may be seen from above-mentioned embodiments that the following beneficial effects may be at least achieved.

For the adaptive die testing apparatus of the present disclosure, when the adaptive die testing apparatus is at the testing state, the lower surface of the upper test socket is in a close contact with the upper surface of the lower test socket, and the sealed chamber for placing the die to-be-tested is formed at the region of the groove; the PCB (printed circuit board) and the separation plate are stacked sequentially above the upper test socket; the upper test socket, the PCB and the separation plate, which are fixed connected to each other, are connected to the support frame through the installation plate disposed above the separation plate; and an end of a pipeline sequentially passes through the installation plate, the separation plate, the PCB and the upper test socket and is connected to the sealed chamber, and another end of the pipeline is configured to be connected to a high-pressure gas source. The die is protected with high-pressure gas to improve the safety of the die under high-current and high-voltage testing condition. Furthermore, the strip-shaped through hole is formed at the upper surface of the support frame; the first protruding strip is at each of the lower portions of two opposite inner walls of the strip-shaped through hole; a corresponding second protruding strip extending directly above the first protruding strip is at each of the upper portions of two opposite side surfaces of the installation plate, the strip-shaped block is disposed above each second protruding strip; a side of the strip-shaped block is fixedly connected to the upper surface of the support frame, and another side of the strip-shaped block extends to directly above the second protruding strip and is connected to the second protruding strip through at least two springs. When the adaptive die testing apparatus is at the non-testing state, the lower surface of the second protruding strip is adjoined to be in a contact with an upper surface of a corresponding first protruding strip; and when the adaptive die testing apparatus is at the testing state, the lower surface of the upper test socket is in a close contact with the upper surface of the lower test socket, and the gap is formed between the lower surface of the second protruding strip and the upper surface of the corresponding first protruding strip. After the mold including the upper test socket and the lower test socket is closed, the plane reference of the upper test socket may be converted from the support frame to the lower test socket; and the springs may absorb and balance out slight deviation on the horizontal plane, thereby achieving a tight and flat contact or attachment between the upper test socket and the lower test socket. In such way, it may not only improve overall sealing and pressure resistance performance of the test sockets, but also ensure the consistency of the contact resistance between each test pin and corresponding pad region on the die, thereby improving test data consistency.

Above-mentioned embodiments may be only for illustrating technical concepts and features of the present disclosure. The purpose may be to make those skilled in the art understand the content of the present disclosure and implement the present disclosure accordingly and may not limit the protection scope of the present disclosure. All equivalent changes or modifications made based on the spirit and essence of the present disclosure shall be included in the protection scope of the present disclosure.

What is claimed is:

1. An adaptive die testing apparatus, comprising:
   a support frame capable of moving along a vertical direction;
   a movable panel capable of moving along a horizontal direction;
   an upper test socket installed on the support frame; and
   a lower test socket installed on the movable panel and capable of moving with the movable plate to directly below the upper test socket, wherein:
     a groove is formed on a lower surface of the upper test socket and/or an upper surface of the lower test socket;
     when the adaptive die testing apparatus is at a testing state, the lower surface of the upper test socket is in a close contact with the upper surface of the lower test socket, and a sealed chamber for placing a die to-be-tested is formed at a region of the groove; a PCB (printed circuit board) and a separation plate are stacked sequentially above the upper test socket; the upper test socket, the PCB and the separation plate, which are fixed connected to each other, are connected to the support frame through an installation plate disposed above the separation plate; and an end of a pipeline sequentially passes through the installation plate, the separation plate, the PCB and the upper test socket and is connected to the sealed chamber, and another end of the pipeline is configured to be connected to a high-pressure gas source;
     a strip-shaped through hole is formed at an upper surface of the support frame; a first protruding strip is at each of lower portions of two opposite inner walls of the strip-shaped through hole; a corresponding second protruding strip extending directly above the first protruding strip is at each of upper portions of two opposite side surfaces of the installation plate; a strip-shaped block is disposed above each second protruding strip; a side of the strip-shaped block is fixedly connected to the upper surface of the support frame, and another side of the strip-shaped block extends to directly above the second protruding strip and is connected to the second protruding strip through at least two springs; and
     when the adaptive die testing apparatus is at a non-testing state, a lower surface of the second protruding strip is adjoined to be in a contact with an upper surface of a corresponding first protruding strip; and when the adaptive die testing apparatus is at the testing state, the lower surface of the upper test socket is in a close contact with the upper surface of the lower test socket, and a gap is formed between the lower surface of the second protruding strip and the upper surface of the corresponding first protruding strip.

2. The adaptive die testing apparatus according to claim 1, wherein:
   each second protruding strip is connected to the strip-shaped block by a plurality of springs arranged at equal intervals along a length direction of the strip-shaped block.

3. The adaptive die testing apparatus according to claim 1, wherein:
   an installation groove for an end portion of a spring to be inserted is formed at an upper surface of the second protruding strip and/or at a lower surface of the strip-shaped block.

4. The adaptive die testing apparatus according to claim 1, further including:
   an installation base plate vertically configured, wherein two vertical guiding rails spaced apart from and in parallel with each other are installed on a side surface of the installation base plate; a vertical portion of the support frame is matched with and connected to each vertical guiding rail through at least two vertical sliding blocks to make the two vertical guiding rail move along the vertical direction; the upper test socket is installed on a horizontal portion of the support frame; and the horizontal portion is at an upper end of the vertical portion and extends to another side of the installation base plate.

5. The adaptive die testing apparatus according to claim 4, wherein:
- a horizontal base is installed on another side surface of the installation base plate and below the horizontal portion of the support frame; two horizontal guiding rails spaced apart from and in parallel with each other are installed on an upper surface of the horizontal base; and a lower surface of the movable plate is connected to each horizontal guiding rail through at least two horizontal sliding blocks.

6. The adaptive die testing apparatus according to claim 5, wherein:
- a T-shaped block is disposed on the lower surface of the movable plate and between the two horizontal guiding rails; a T-shaped groove matched with the T-shaped block is formed at the horizontal base; and the T-shaped block is capable of being slidably inserted in the T-shaped groove extending along the horizontal direction.

7. The adaptive die testing apparatus according to claim 1, wherein:
- a two-way sliding platform is installed on an upper surface of the movable plate, and the lower test socket is installed on the two-way sliding platform.

8. The adaptive die testing apparatus according to claim 1, wherein:
- a lower surface of the lower test socket is connected to a lower base plate; a vacuum pipe joint is installed on a side surface of the lower base plate; a vacuum pipeline is disposed in the lower test socket and the lower base plate; and one end of the vacuum pipeline is connected to the sealed chamber, and another end of the vacuum pipeline is connected to the vacuum pipe joint.

9. The adaptive die testing apparatus according to claim 8, wherein:
- an annular groove is formed on an upper surface of the lower base plate and at an outer side of the vacuum pipeline; and an annular sealing strip is inserted in the annular groove.

10. The adaptive die testing apparatus according to claim 1, wherein:
- a sealing strip is disposed between the lower surface of the upper test socket and the upper surface of the lower test socket; and the sealing strip extends continuously along peripheral edges of the upper test socket and the lower test socket.

11. An adaptive die testing apparatus, comprising:
- a support frame capable of moving along a vertical direction;
- a movable panel capable of moving along a horizontal direction;
- an upper test socket installed on the support frame; and
- a lower test socket installed on the movable panel and capable of moving with the movable plate to directly below the upper test socket, wherein:
  - a groove is formed on a lower surface of the upper test socket and/or an upper surface of the lower test socket; and
  - when the adaptive die testing apparatus is at a testing state, the lower surface of the upper test socket is in a close contact with the upper surface of the lower test socket, and a sealed chamber for placing a die to-be-tested is formed at a region of the groove; a PCB (printed circuit board) and a separation plate are stacked sequentially above the upper test socket; the upper test socket, the PCB and the separation plate, which are fixed connected to each other, are connected to the support frame through an installation plate disposed above the separation plate; an end of a pipeline sequentially passes through the installation plate, the separation plate, the PCB and the upper test socket and is connected to the sealed chamber, and another end of the pipeline is configured to be connected to a high-pressure gas source; and the separation plate, the PCB and the upper test socket are fixedly connected to each other through at least two sets of bolts and nuts.

12. The adaptive die testing apparatus according to claim 11, further including:
- a strip-shaped through hole formed at an upper surface of the support frame, wherein a first protruding strip is at each of lower portions of two opposite inner walls of the strip-shaped through hole; and a corresponding second protruding strip extending directly above the first protruding strip is at each of upper portions of two opposite side surfaces of the installation plate; and
- a strip-shaped block disposed above each second protruding strip, wherein a side of the strip-shaped block is fixedly connected to the upper surface of the support frame, and another side of the strip-shaped block extends to directly above the second protruding strip and is connected to the second protruding strip through at least two springs.

13. The adaptive die testing apparatus according to claim 12, wherein:
- when the adaptive die testing apparatus is at a non-testing state, a lower surface of the second protruding strip is adjoined to be in a contact with an upper surface of a corresponding first protruding strip; and when the adaptive die testing apparatus is at the testing state, the lower surface of the upper test socket is in a close contact with the upper surface of the lower test socket, and a gap is formed between the lower surface of the second protruding strip and the upper surface of the corresponding first protruding strip.

14. The adaptive die testing apparatus according to claim 11, wherein:
- each second protruding strip is connected to the strip-shaped block by a plurality of springs arranged at equal intervals along a length direction of the strip-shaped block.

15. The adaptive die testing apparatus according to claim 11, wherein:
- an installation groove for an end portion of a spring to be inserted is formed at an upper surface of the second protruding strip and/or at a lower surface of the strip-shaped block.

16. The adaptive die testing apparatus according to claim 11, wherein:
- a two-way sliding platform is installed on an upper surface of the movable plate, and the lower test socket is installed on the two-way sliding platform.

17. The adaptive die testing apparatus according to claim 11, wherein:
- a lower surface of the lower test socket is connected to a lower base plate; a vacuum pipe joint is installed on a side surface of the lower base plate; a vacuum pipeline is disposed in the lower test socket and the lower base plate; and one end of the vacuum pipeline is connected to the sealed chamber, and another end of the vacuum pipeline is connected to the vacuum pipe joint.

18. A formation method of an adaptive die testing apparatus, comprising:
- disposing a support frame capable of moving along a vertical direction and a movable panel capable of moving along a horizontal direction;
- installing an upper test socket on the support frame; and
- installing a lower test socket on the movable panel, wherein the lower test socket is capable of moving with the movable plate to directly below the upper test socket, wherein:
  - a groove is formed on a lower surface of the upper test socket and/or an upper surface of the lower test socket;
  - when the adaptive die testing apparatus is at a testing state, the lower surface of the upper test socket is in a close contact with the upper surface of the lower test socket, and a sealed chamber for placing a die to-be-tested is formed at a region of the groove; a PCB (printed circuit board) and a separation plate are stacked sequentially above the upper test socket; the upper test socket, the PCB and the separation plate, which are fixed connected to each other, are connected to the support frame through an installation plate disposed above the separation plate; and an end of a pipeline sequentially passes through the installation plate, the separation plate, the PCB and the upper test socket and is connected to the sealed chamber, and another end of the pipeline is configured to be connected to a high-pressure gas source;
  - a strip-shaped through hole is formed at an upper surface of the support frame; a first protruding strip is at each of lower portions of two opposite inner walls of the strip-shaped through hole; a corresponding second protruding strip extending directly above the first protruding strip is at each of upper portions of two opposite side surfaces of the installation plate; a strip-shaped block is disposed above each second protruding strip; a side of the strip-shaped block is fixedly connected to the upper surface of the support frame, and another side of the strip-shaped block extends to directly above the second protruding strip and is connected to the second protruding strip through at least two springs; and
  - when the adaptive die testing apparatus is at a non-testing state, a lower surface of the second protruding strip is adjoined to be in a contact with an upper surface of a corresponding first protruding strip; and when the adaptive die testing apparatus is at the testing state, the lower surface of the upper test socket is in a close contact with the upper surface of the lower test socket, and a gap is formed between the lower surface of the second protruding strip and the upper surface of the corresponding first protruding strip.

19. The formation method according to claim 18, wherein:
- each second protruding strip is connected to the strip-shaped block by a plurality of springs arranged at equal intervals along a length direction of the strip-shaped block.

20. The formation method according to claim 18, wherein:
- an installation groove for an end portion of a spring to be inserted is formed at an upper surface of the second protruding strip and/or at a lower surface of the strip-shaped block.

* * * * *